United States Patent [19]

Bier et al.

[11] Patent Number: 4,897,233

[45] Date of Patent: Jan. 30, 1990

[54] METHOD OF MAKING REINFORCED MATERIAL

[75] Inventors: Peter Bier, Krefeld; Karl-Dieter Loehr, Alphen; Dieter Titze, Airtrach, all of Fed. Rep. of Germany

[73] Assignee: Bayer AG, Fed. Rep. of Germany

[21] Appl. No.: 181,499

[22] Filed: Apr. 14, 1988

Related U.S. Application Data

[63] Continuation of Ser. No. 945,388, Dec. 22, 1986, abandoned, which is a continuation of Ser. No. 708,497, Mar. 5, 1985, abandoned.

[30] Foreign Application Priority Data

Mar. 7, 1984 [DE] Fed. Rep. of Germany ....... 3408224

[51] Int. Cl.$^4$ ............................................. B29B 9/14
[52] U.S. Cl. ................................. 264/108; 264/45.3; 264/102; 264/211.23; 264/257; 264/258; 264/322; 264/349; 428/304.4

[58] Field of Search .................. 264/451.3, 45.3, 102, 264/108, 211.23, 257, 349, 258, 322; 428/304.4

[56] References Cited

U.S. PATENT DOCUMENTS

| 3,702,356 | 11/1972 | Hall | 264/141 |
| 3,947,169 | 3/1976 | Wolff et al. | 425/71 |
| 4,015,039 | 3/1977 | Segal et al. | 264/136 X |
| 4,178,411 | 12/1979 | Cole et al. | 264/45.3 X |

Primary Examiner—Jeffery Thurlow
Attorney, Agent, or Firm—Connolly and Hutz

[57] ABSTRACT

The invention relates to a fibre-reinforced thermoplastic semi-finished product includes a thermoplastically processible polymer and long individual reinforcing fibres which form a coherent skeleton, which product can be processed in stamping presses to give moulded articles having a very high surface quality and very good physical properties, and a process for producing this product.

5 Claims, 3 Drawing Sheets

METHOD OF MAKING REINFORCED MATERIAL

This application is a continuation of application Ser. No. 945,388, filed Dec. 22, 1986, now abandoned which in turn is a continuation of application Ser. No. 708,497, filed Mar. 5, 1985, now abandoned.

The invention relates to a reinforced material and a process for the production thereof by means of a screw machine, said reinforced material consisting of filling elements which are sensitive of shearing forces and a plastic matrix consisting, in particular, of thermoplastically processible polymers.

The reinforcement of polymers with glass fibres is known. Articles made of glass-fibre-reinforced polymers are used when high strength combined with low weight is required.

Glass-fibre-reinforced polymerisable resin moulding compositions such as unsaturated polyesters and epoxide resins are moulded predominantly in presses. The length of the glass fibres is retained during this process.

In such processes the glass fibres are not present singly but as glass fibre bundles consisting of about 20 to 600 filaments. For the production of moulded articles such resin moulding compositions have to be completely polymerised at elevated temperatures and possibly under pressure. This takes a long time. Once the moulded articles have been produced they cannot be remoulded and consequently cannot be re-used as a raw material.

It is also known to process glass-fibre-reinforced thermoplastics by injection-moulding.

The disadvantage of this process is that the glass fibres are reduced to average lengths of 200–500 μm as a result of the high shearing forces. Such filling elements produced only a slight improvement in strength.

Thermoplastics reinforced with glass fibre mats also exist, which are heated and then moulded, without any additional external supply of heat, by methods customary in the art of metal-moulding, such as deep-drawing, stretch-forming, punching and stamping. Such products and processes for moulding them are described for example, in: GDR Patent Specification No. 20,459, German Offenlegungsschrift No. 2,312,816, GB Patent Specification No. 791,567, U.S. Pat. No. 3,850,723, German Offenlegungsschrift No. 1,204,097, U.S. Pat. No. 2,662,044, German Offenlegungsschrift No. 3,112,496, U.S. Pat. No. 3,920,879 and U.S. Pat. No. 4,291,084.

Conventional glass-mat-reinforced thermoplastic semi-finished products have certain more or less pronounced disadvantages, such as surface defects, insufficient homogeneity and incomplete impregnation of the glass mats with the melt. The following can be said in detail concerning these disadvantages.

Firstly, the composition of the glass-mat-reinforced sheet is only macroscopically homogeneous. Microscopically it consists of a net-like glassmat with a separate thermoplastic phase and these form separate regions of their own within the total structure. Secondly, the separation, already mentioned, of the resin matrix and the reinforcement fibres frequently occurs during the moulding procedure, particularly at irregular corners, edges, ridges, knobs, inserts and the like.

Also, in comparison with the injection-moulded material the surface quality is lower owing to the accumulation of glass fibres from the glass fibre strands which consist of about 100 to 600 individual filaments and of which the glass fibre mats are composed. The local accumulations of glass fibres appear in the form of variations in the thickness of the walls of the finished article. Also, separation of the glass-fibre mats and the thermoplastic melt readily occurs at sites of deflection during the moulding operation, especially during flow-moulding, and this can lead to marked inhomogeneities and even to glass bundles emerging from the surface. The defects in the surface appear in the form of roughness, waviness, furrows etc.

Improved surfaces can be obtained with short-glass-fibre-reinforced semi-finished material, which, to enable it to be handled during the heating-up and moulding process, contains a small quantity (10% by weight) of a mat-like carrier. Such products and processes for their production are described, for example, in
U.S. Pat. No. 4,240,857,
U.S. Pat. No. 4,238,266,
U.S. Pat. No. 4,207,373,
U.S. Pat. No. 4,098,943,
U.S. Pat. No. 4,044,188,
U.S. Pat. No. 4,015,039 and
U.S. Pat. No. 3,765,993.

The improved surface of these products is obtained by reducing the glass mat content, which is then only about one third, in favour of the short homogeneously dispersed single fibres. Accordingly, however, the high mechanical properties, which are obtained by reinforcement with long fibres as opposed to short fibres, are diminished.

The aim of the invention is to find a reinforced shrink-hole-free material and a process for the production thereof, in which the material possesses an equally high strength distributed uniformly throughout its volume, retains smooth surfaces even after further processing in its softened state, exhibits only a slight tendency to stick in the region of the processing temperature, does not alter its structure during flow-moulding, even where there are thin wall sections and can be adjusted by simple means to specific physical requirements, such as screening, low weight, impact strength stiffness and lamination.

This aim is fulfilled according to the invention in that individual fibres which have a length of more than 3 mm and are present in a quantity of 5–80% by weight, form, as filling elements, a skeleton inside the plastic matrix with a degree of homogeneity, which is determined from a frequency curve of the grey value distribution obtained by contact radiomicrography, of $M \geq 0.9$, and in that, when applying static stress to the material at a temperature higher than its softening point, the gravitational force acting on the material does not cause any substantial changes in the bond between the skeleton of individual fibres and the plastic matrix.

In the case of the material according to the invention the individual fibres form a coherent skeleton as a result of their homogeneous distribution and when the material is heated for the purpose of further processing this skeleton holds together the softened, or even liquid plastic matrix with viscosities higher than 10 Pas, despite the gravitational force acting thereupon, so that neither a change in structure influencing the strength properties nor separation from the plastic occurs. The surface quality is also retained since the filling elements do not migrate. In addition the material is free of shrink holes since it allows itself to be thoroughly mixed.

Thus the material according to the invention has rheological properties which allow it to be handled easily, for example when placing the blank into a mould.

Surprisingly, the bond, once formed, remains even during further processing, especially during deep-drawing; this also applies especially to thin-walled parts. The strength of the material is very high since the forces are transmitted over relatively great distances via fibres or filaments which, depending on the field of application, have lengths of 3 - 12 - 23 - 40 mm or more, which fact can be attributed to the improved anchorage of the ends in comparison with short fibres and to the skeleton-like structure.

In other embodiments hollow balls are present in the plastic matrix, in a quantity of 5-60% by weight, in addition to individual fibres which have a length of $\geq 3$ mm and are present in a quantity of more than 5% by weight.

Even by adding a small number of individual fibres (e.g. a quantity of $\geq 5\%$ by weight) the rheological properties can be substantially improved, so that a heated, kneadable plastic filled with hollow balls can be more easily handled and moulded owing to its higher structural stability.

In one possible embodiment metal platelets are present in the plastic matrix, in a quantity of 10-60% by weight, in addition to individual fibres which have a length of more than 3 mm and are present in a quantity of more than 5% by weight.

The metal platelets provide the material with good screening properties. The disadvantage of their unfavourable influence on the strength of the material can be compensated by means of a homogeneous coherent skeleton of individual fibres (e.g. a quantity of 5% by weight) so that even if there are relatively large metallic platelets the material can be handled easily at temperatures higher than the softening point.

In a preferred embodiment the plastic matrix is reinforced with additional chopped glass filling elements of a length of 4-24 mm and in a quantity of between 4-14% by weight, in addition to the skeleton of individual fibres of a length of at least 3 mm.

By means of the chopped glass filling elements which are mainly added in the form of layers to the already homogenised composition consisting of the plastic matrix and the individual fibres, the toughness can be substantially improved by means of a distinct yield point without any decrease in stiffness and strength, which means that the formation of splinters when the material is subjected to catastrophic, sudden stress, is prevented. When the chopped glass is homogeneous distribution over the surface it is transported along with the flow, via deflections, thickened parts and wide flow paths during flow-moulding, so that no undesired roughness occurs by the emergence of chopped glass from the surface.

In one possible embodiment the plastic matrix is reinforced with undirectional glass fibre bundles in a quantity of 4-14% by weight, in addition to the skeleton consisting of individual fibres of a length of at least 3 mm.

The glass fibre bundles, which are normally composed of individual fibres, act as a reinforcement and can also transmit tensile forces over relatively large distances, the bundles being anchored along their whole length or only in regions, in particular in the end regions.

In one possible embodiment hollow spaces are present in the material.

Long individual fibres can be joined by the plastic matrix to form a skeleton which is characterised by many hollow spaces which can be in the form of open or closed pores. Such a material possesses high strength, low specific weight and, if applicable, high filtering efficiency.

In one embodiment the material is incorporated as a laminate in a layered element.

Owing to the special properties of the material it can also be used advantageously specifically in layered constructions.

For the production of materials with filling elements which are sensitive to shearing forces a process is provided in which, after the addition of the fillers to the plastic all of the following screw sections with a high degree of filling ($\epsilon = 1$) are operated with a kinematic operating parameter $\Lambda$, which indicates the ratio of the quantities q transported by a filled screw section at a prevailing operating state to the maximum quantities q max to be transported through the screw at a differential pressure $\Delta p = 0$, or $\geq \Lambda max$.

The kinematic operating parameter $\Lambda$ of a filled ($\epsilon = 1$) screw falls, given isothermal conditions, continuously from $\Lambda = 0$ to $\Lambda = 1$, as shown in the diagram of FIG. 1, in the case of plasticised or molten highly viscous compositions or similar materials which are strengthened with fillers or reinforcing materials which are not interlaced or interconnected and can only be unsubstantially further reduced in size.

It was therefore completely surprising for the skilled man that melts with, for example, interlaced or interconnected filling elements form, when being conveyed within pressure zones in screw structures, characterised curves which run above the characteristic curve of the pure carrier material and which have a distinct peak at $\Lambda max$, and that destruction during processing can be substantially avoided if the operating parameter $\Lambda$ is the same as or greater than $\Lambda_{max}$. Owing to the non-destructive treatment of the filling elements it is possible to obtain, by mixing, a high degree of homogeneity, which substantially determines the properties, in particular the rheology of the material, during processing, since the bond produced in the above manner, between the fibre skeleton and the plastic matrix, does not exhibit any tendency to separate, nor do the structures show any tendency to collapse even in the re-heated state. The high strength of the material is thus retained.

A detailed description of the kinematic operating parameter is described in I. Pawolowski "Die Ähnlichkeitstheorie in der physikalisch-technischen Forschung" (The similutude theory in physico-technical research) Springer-Verlag, Berlin 1971.

In one particular embodiment of the process the screw sections are operated with a kinematic operating parameter $\Lambda \geq \frac{1}{3}$ after the filling elements, consisting of hollow balls and/or individual fibres have been added to a thermoplastic material.

Glass fibres and hollow balls, which owing to their brittleness, are destroyed by the strong shearing action in the two known processes, can now be incorporated into the material concerned without being reduced in size by reason of the non-destructive method of incorporation and this allows a high degree of homogeneity to be achieved which in turn has a determinative influence on the further processing of the material and its strength.

In a further embodiment of the process the screw sections following the addition of the filling elements consisting of metal platelets and/or individual fibres to a thermoplastic material, are operated with an operating parameter of $\Lambda \geqq \frac{1}{3}$.

Despite the problematical incorporation of metal platelets a homogeneous, shrink-hole-free material can be produced, in particular by means of the addition of glass fibres, which material can be further processed without any difficulty.

In another embodiment of the process a conveying apparatus takes over the transportation at the end of the screw.

An additional conveying apparatus at the end of the homogenising screw takes over the pumping operation.

In one possible embodiment of the process at least one reinforcement layer is introduced into the composition following the nozzle.

By means of two parallel superimposed wide-slot dies webs can be produced between which the chopped glass fibres or unidirectional long fibres are placed before both webs are pressed together by a roller.

The homogeneity of the fibre distribution in the thermoplastic semi-finished product reinforced with long fibres according to the invention was determined by contact-microradiographical photographs in conjunction with an automatic picture-analysis system. Glass-fibre-containing thermoplastic sheets (30% by weight) of a thickness of 3 mm, which on the one hand contained the glass fibres according to the invention in the form of homogeneously distributed individual fibres (length: 24 mm) and on the other hand, by way of comparison, corresponding, incompletely separated chopped strands, and a sample containing 30% by weight of glass mats, were used as an example. The contact microradiographical photographs were taken with a W-X-ray tube and the negative were exposed and developed with optimum contrast. The negatives were processed in a uniform manner on special paper. The positives from the microradiography, after being printed on paper of identical gradation, were, after being uniformly lighted by means of a TV-camera of the Chalnikon type from the Siemens company, passed to the fully automatic picture analysis system IBAS I and II from the companies Zeiss/Kanton. The TV pictures (about 6×6 cm) taken were stored as grey value pictures with a matrix of 512×512 picture points with in each case 256 grey value grades and a total grey value distribution was prepared.

If the glass fibre distribution in the sample is not uniform the grey values are distributed unsymmetrically around the most frequent value. The deviation from Gaussian distribution is more pronounced the more non-uniformly the glass fibres are distributed in the sample. The grey values vary very greatly per picture point (corresponding to a picture area of 0.1×0.1 mm), depending on whether the glass fibres in the element of area under observation are in bundles, separate or not present at all. If the fibre distribution is statistically uniform the variations in concentration are distributed normally. Accordingly the grey values are distributed normally. The narrower the Gaussian curve (characterised by the standard deviation) the more uniform the distribution of the fibres (variations in concentration). The degree of homogeneity M according to Julius W. Hiby: "Definition und Messung der Mischgüte" (Definition and measurement of mixed products) in Chem. Ing. Techn. 51 (1979) No. 7, page 705) which was calculated according to equation 1 from the frequency curve of the grey value distribution determined, was used as a quantitative criterion of the quality of the fibre distribution.

$M = 1 - \delta\delta$ (equation 1)
$\delta\delta = \sigma/\bar{a}$
$M$ = degree of homogeneity
$\delta\delta$ = relative standard deviation
$\underline{\delta}$ = standard deviation
$\bar{a}$ = average value of the frequency curve.

According to this the semi-finished products according to the invention possess M values of $\geqq 0.9$, products with incompletely separated glass fibre bundles (chopped strands) M values of between 0.8 and 0.87, and glass-mat-containing products M values in the order of 0.5 to 0.7 Maximum homogeneity is present at $M = 1$.

The plastics which can be used for the material (semi-finished products) are all reactive resins and thermoplastically processible polymers, the term polymers also including mixtures of two or more polymers. Resin compositions based on alkenyl aromatics such as polystyrene, styrene copolymers, mixtures and graft copolymers of styrene and rubber, are suitable. Vinyl chloride PVC or vinylidene PVDC copolymers (Saran) and polymers can also be used for the invention. Further thermoplastic resin compositions which are suitable according to the invention are: polyolefins such as, for example, polyethylene, polypropylene, polymethylpentene, and copolymers thereof, polyamides such as, for example, polyamide 6,6; polyamide 6, I; polyamide-6, T, etc.

Polycarbonates such as, for example, bisphenol-A-polycarbonate, copolycarbonate of bisphenol A, terephthalic acid, isophthalic acid and carboxylic acid etc. linear aromatic polyesters such as for example, polybutylene terephthalate, polyethylene terephthalate, cyclohexane dimethylol terephthalate, copolyesters of terephthalic acid, isophthalic acid and bisphenol A, etc., cellulose esters such as for example cellulose acetate, cellulose propionate, cellulose nitrate, etc. as well as halogenated olefins, polyacetals, polyphenylene sulphide, polyphenylene oxide and polysulphones.

PPO/HIPS; PC/polyester; PC/ABS; rubber-modified polyamides or rubber-modified polyesters etc. Polyesters, polyamides, polycarbonate, polyphenylenesulphide and modified polyethylene terephthalates, the latter being described in German Offenlegungsschrift No. 2,653,120 and German Offenlegungsschrift No. 2,706,128, are particularly preferred.

The polymers can contain customary auxiliaries such as stabilising agents against heat and light, plasticising agents, fillers, pigments, processing auxiliaries, extenders, agents for increasing impact strength and agents for improving flameproofness. Suitable reinforcing fibres are mineral, organic and/or metallic.

Preferred mineral reinforcing fibres are glass fibres, normally in the form of endless strands (rovings) or chopped strands.

The glass fibres can be sized in a customary manner. Sizes are usually preparations which contain one or more lubricants, emulsifiers, coupling agents, agents for regulating the pH value, film-forming synthetic binders, antistatic agents and/or wetting agents. Preferred coupling agents are organic silicon compounds such as silyl peroxide compounds, alkoxy silanes, aminoalkoxy silanes, vinylalkoxy silanes and aminoalkylalkoxy silanes and epoxyalkylalkoxy silanes.

Preferred organic reinforcing fibres are carbon fibres and aramide fibres. A description of these fibres and the use thereof for reinforcing plastics can be found in "Kohlenstoff- und aramidfaserverstärkte Kunststoffe (Plastics reinforced with carbon or aramide fibres), VDI-Verlag GmbH., Düsseldorf, 1977".

Preferred metallic fibres are steel, aluminium and copper fibres.

Even very low quantities of the carbon and metal fibres produce effective electromagnetic screening, owing to the network structure of the products according to the invention. Metallised glassfibres can also be used, in like manner, for such applications.

The length of the fibres should be more than 3 mm, large lengths such as 12, 24 and 40 mm being particularly preferred. The diameter can be varied between 5 and 100 μm, preferably between 10 and 24 μm, the quantity being between 5 and 80% by weight. In the case of chopped glass filling elements and unidirectional glass bundle filling elements the quantities are between 4-14% by weight, preferably 8-12% by weight. The diameter of the individual fibres is 5-50 μm, preferably 10-24 μm at an individual tex of 10-800, preferably 20-50. The glass fibre bundles of the filling elements are separated by the long-fibre-containing thermoplastic matrix to an extent of at most 50%, preferably no more than 20%.

Suitable hollow balls are for example glass or ceramic hollow balls from the following companies: 3M, Emersan and Cunning Inc. or PQ Corp., hollow balls made of phenolic resins from the Union Carbide company or those made of epoxy resins from the company Emerson and Cunning Inc., or those made of other duromer resins such as for example, polyurea. Preferred hollow balls are hollow glass balls.

The glass or ceramic hollow balls can be sized. Sizes are usually preparations which contain one or more lubricants, emulsifiers, coupling agents, agents for regulating the pH value, film-forming synthetic binders, antistatic agents and/or wetting agents. Preferred coupling agents are organic silicon compounds, such silyl peroxide compounds, alkoxy silanes, aminoalkoxy silanes, vinylalkoxy silanes and aminoalkylakoxy silanes, and epoxyalkylalkoxy silanes.

Hollow balls with a diameter of between 0.005-5 mm, in particular 0.02-0.2 mm, and a wall thickness of between 0.2-5 mm can be added in an amount of up to 60% by weight.

Suitable metal platelets are for example aluminium flakes of type K-102 HE from the Transmet company (1 mm×1.4 mm×0.025 mm).

The flakes should have a surface area of between 0.25-100 mm² and a thickness of 0.01-1 mm and can be added in an amount of 10-60% by weight.

Three drawings are attached for the purposes of illustration.

Figure 1:
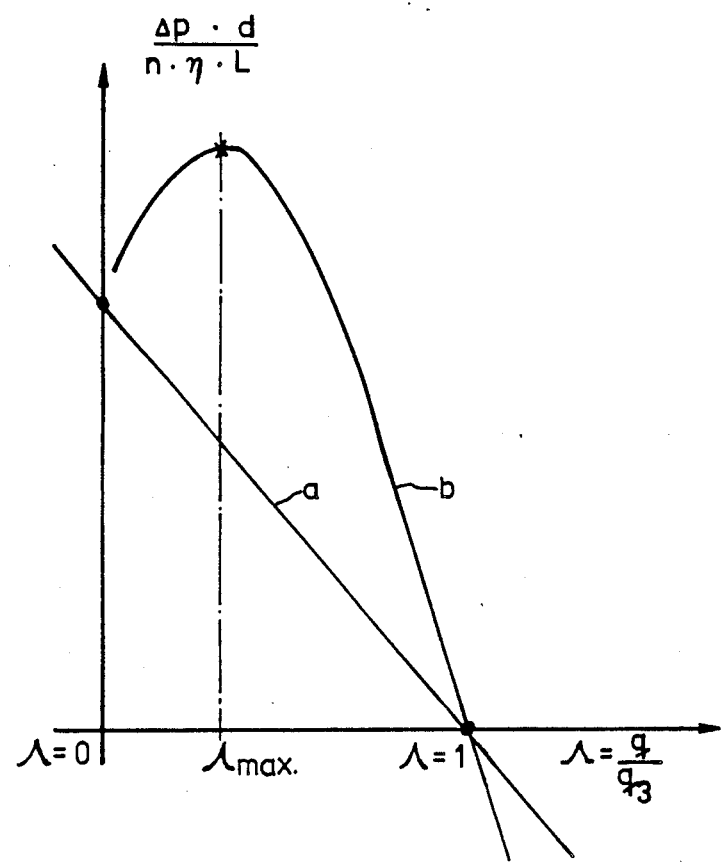
FIG. 1 is a diagram showing the operating parameters.

In FIG. 1 the operating state according to Pawlowski, of a screw which is completely filled (degree of filling $\epsilon=1$), is shown in the form of a diagram by way of an operating parameter $\Lambda$ as a function of the back pressure $\Delta p$. The operating parameter $\Lambda$ indicates the ratio of the actual throughput q to the maximum possible quantity of material transported by drag flow at a differential pressure $\Delta p=0$.

Whereas, in the case of pure melts or solid-filled melts, in which the solid filling elements only form a loose bond with each other and only undergo minor reduction in size and the value falls continuously in a linear manner from $\Lambda=0$ to $\Lambda=1$ (line a), the characteristic curve for melts containing filling elements which undergo marked reduction in size has a maximum between $\Lambda=0$ and $\Lambda=1$ (curve b). According to investigations this maximum $\Lambda_{max}=q/q$ max is at about $\frac{1}{3}$ for glass, hollow balls and metal platelets, destruction of these filling elements only not taking place when the screw is operated at an operating parameter $\Lambda$ of higher than $\Lambda_{max}$. A screw section with a kinematic operating parameter $\Lambda$ of higher than 1 operates at an over-run region of operation in which the screw is inundated from behind in the direction of transportation. In the state of partial filling in a screw section a q/q max of <1 applies at a differential pressure of $\Delta p=0$ between the inlet and outlet end cross-sections of the screw section. Thus, even with partial filling, there is drag flow with a low degree of stress on the plastic material.

Figure 2:
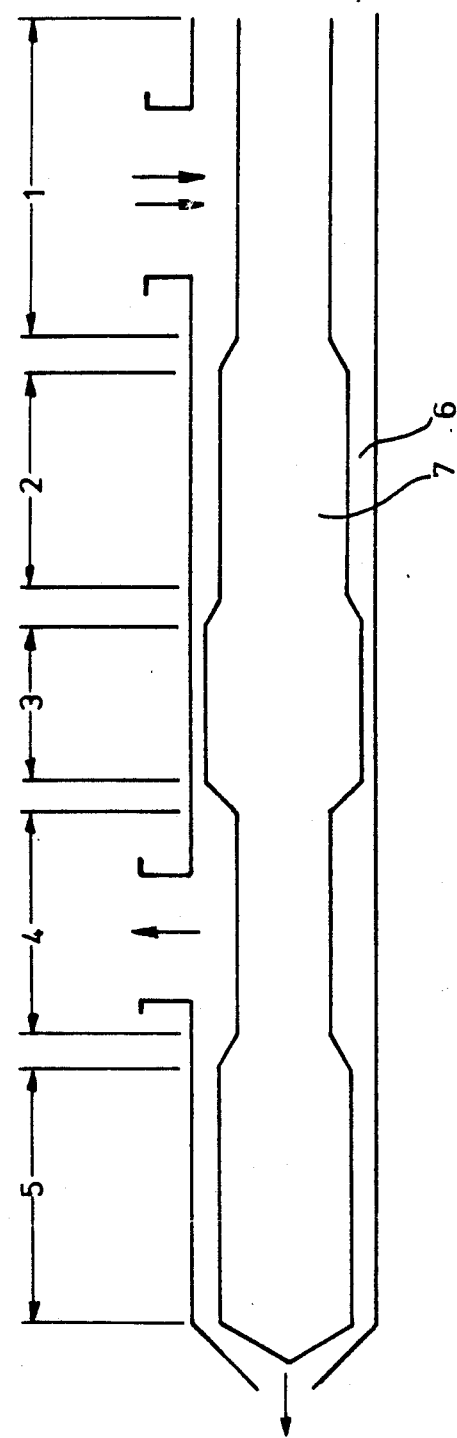
FIG. 2 shows the distribution of the zones along a screw.

$\Delta p$ = pressure difference in a filled screw section
d = diameter of the cylinder
l = length of the filled screw section
$\eta$ = viscosity of the viscous phase
n = speed of rotation
q = quantity transported In FIG. 2 a screw machine is illustrated in which a screw 7 having the following technical data is arranged in a housing 6 of a diameter of 100 mm.

| sect. | function | depth of screw channel [μm] | pitch [μm] | relative length |
|---|---|---|---|---|
| 1 | material introduction | 15 | | 2D |
| 2 | homogenisation | 7,5 | | 3D |
| 3 | throttling region | 2,5 | 1 × D | 2D |
| 4 | degasification | 15 | | 3D |
| 5 | pumping region | 5 | | 4D |

Figure 3:
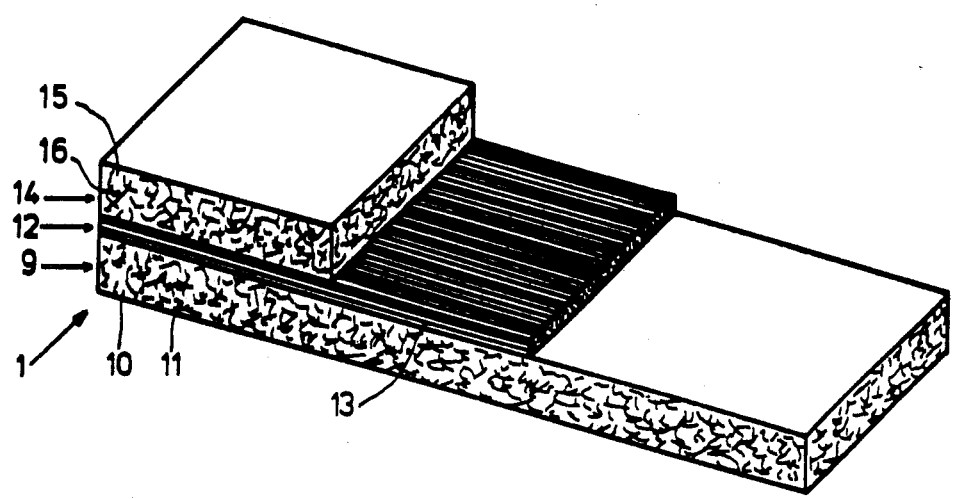
FIG. 3 shows a perspective view of a semi-finished product.

FIG. 3 shows a perspective view of a semi-finished product in which a layer 12 of unidirectional glass fibres 13 (chopped glass) is arranged on a bottom layer 9 consisting of a plastic matrix 10 and a skeleton of individual fibres 11, a further layer consisting of a plastic matrix 15 and a skeleton of individual fibres 16 being supeimposed on layer 12.

| Starting product | Example (see FIG. 2) | | | | | |
|---|---|---|---|---|---|---|
| | Modified PETP | PBT | PA-6 | PC | PC/ABS | PA-6 |
| | glass fibres | glass fibres | glass fibres | glass fibres | glass fibres | glass fibres |
| % by weight | 30 | 30 | 30 | 20 | 20 | 40 |
| l [mm] | 48 | 44 | 45 | 38 | 37 | 38 |
| Throughput kg/h | 100 | 100 | 100 | 100 | 100 | 100 |
| Density kg/ltr. | 1.4 | 1.4 | 1.45 | 1.25 | 1.2 | 1.95 |
| Speed of rotation min⁻¹ | 25 | 25 | 30 | 35 | 35 | 20 |

-continued

| Operating parameter | | | | | | |
|---|---|---|---|---|---|---|
| 2 | 0.47 | 0.47 | 0.38 | 0.39 | 0.42 | |
| 3 | 1.59 | 1.59 | 1.27 | 1.26 | 1.32 | 1.42 |
| 5 | 0.68 | 0.68 | 0.55 | 0.54 | 0.57 | 1.41 |
| Zone 1 and 4 Partial filling | <0.7 | <0.7 | <0.7 | <0.7 | <0.7 | <0.7 |
| Back-pressure (bar) | 3 | 5 | 5 | 8 | 8 | 12 |
| Result | | | | | | |
| Degree of mixing | >0,9 | >0,9 | >0,9 | >0,9 | >0,9 | >0,9 |
| Bending modulus GPa | 9,0 | 8,0 | 8,4 | 6,4 | 5,7 | 20,1 |
| Bending strength mPa | 253 | 225 | 253 | 189 | 146 | 405 |
| Impact strength kg/mm² | 48 | 51 | 65 | 62 | 35 | 67 |

Example

| | | | | | |
|---|---|---|---|---|---|
| Starting product | PAG | PAG | PC/ABS | PC/ABS | PPD |
| Filling elements 1 | glass fibres | — | glass fibres | — | glass fibres |
| % by weight | 10 | — | 10 | — | 80 |
| 1 mm | 48 | — | 40 | — | 36 |
| Filling elements 2 | hollow balls | hollow balls | aluminium flakes | aluminium flakes | air |
| % by weight | 20 | 30 | 30 | 30 | — |
| Throughput kg/h | 100 | 100 | 100 | 100 | 70 |
| Density kg/lts. | 0.96 | 0.82 | 1.3 | 1.4 | 0.5 |
| Speed of rotation min | 30 | 30 | 30 | 25 | 30 |
| Operating parameter | | | | | |
| 2 | 0.55 | 0.55 | 0.42 | 0.47 | 0.4 |
| 3 | 1.85 | 1.85 | 1.42 | 1.59/ 1.3 | |
| 5 | 0.79 | 0.79 | 0.61 | 0.68 | 0.9 |
| Zone 1 and 4 Partial filling | <0.7 | <0.7 | <0.7 | <0.6 | <0.7 |
| Back-pressure bar | 3 | 3 | 6 | 5 | 8 |
| Specific weight | 0.96 | 0.82 | −1,3 | — | ~0.5 |
| Screening effect: | | | | | |
| Frequency: 0.5–960 MHZ | — | — | 60–65 db | 60–65 | — |
| Remarks | (a) | — | (a) | — | (b) |

Example

| | | | |
|---|---|---|---|
| Starting product | PAG | PAG | PP |
| Filling elements 1 | glass fibres | glass fibres | glass fibres |
| % by weight | 20 | 20 | 30 |
| 1 mm | 18 | 18 | 15 |
| filling elements 2(c) | chopped glass | glass fibres strands | chopped glass |
| % by weight | 10 | 10 | 10 |
| 1 mm | 24 | | 24 |
| Throughout kg/h | 100 | 100 | 100 |
| Density kg/ltr. 1 | 0.96 | 0.96 | 1.45 |
| Speed of rotation mm | 30 | 30 | 30 |
| Operating parameter | | | |
| 2 | 0.55 | 0.55 | 0.38 |
| 3 | 1.85 | 1.85 | 1.25 |
| 5 | 0.75 | 0.79 | 0.54 |
| | <0.7 | <0.7 | <0.7 |
| Back-pressure (bar) | 3 | 3 | 5 |
| Result | | | |
| Bending modulus GPa | 7,0 | 8,6 | 5,7 |
| Bending strength mPa | 240 | 183 | 138 |
| Impact strength kJ/m² | 70 | 110 | 50 |
| Notched impact strength [KJ/m²] | 43 | 108 | 42 |

(a) the 4 mm thick molten sheet able to be separated off and processed free transportable
(b) the 6 mm thick web (300° C.) is free transportable
(c) Filling element 2 was introduced between 2 webs of melt containing filling element 1

We claim:

1. Process for the production of materials containing filling elements sensitive to shearing forces comprising the steps of adding the filling elements to an at least kneadable plastic in the first section of a screw machine, operating all subsequent screw sections of the machine with a high degree of filling ($\epsilon=1$) with a kinematic operating parameter $\Lambda$, which indicates the ratio of the quantity q conveyed through a filled screw section at a prevailing operating state to the maximum quantity q max to be conveyed through the screw at a back pressure of $\Delta p=0$, of greater than $\Lambda$ max.

2. Process according to claim 1, characterised in that the screw sections are operated with a kinematic operating parameter of $\Lambda \geq \frac{1}{3}$ after the addition of filling elements consisting of hollow balls and/or individual fibres to a thermoplastic material.

3. Process according to claim 1, characterised in that the screw sections following the addition of filling elements consisting of metal platelets and/or individual fibres to a thermoplastic material, are operated with a kinematic operating parameter of $\Lambda \geq \frac{1}{3}$.

4. Process according to claim 1 including utilizing a conveying apparatus for transportation at the end of the screw.

5. Process according to claim 1, including the further step of introducing at least one reinforcing filling element into the composition after the end of the screw.

* * * * *